Oct. 21, 1930.　　　R. B. HUNTER　　　1,778,976
METHOD OF AND APPARATUS FOR CONTROLLING ELECTRIC MOTORS
Filed Dec. 15, 1926
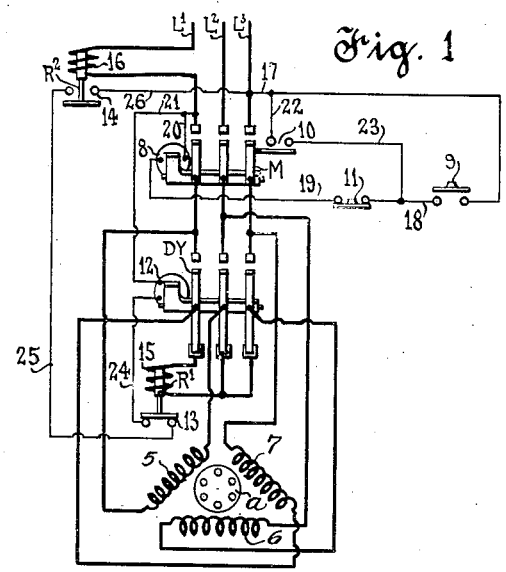
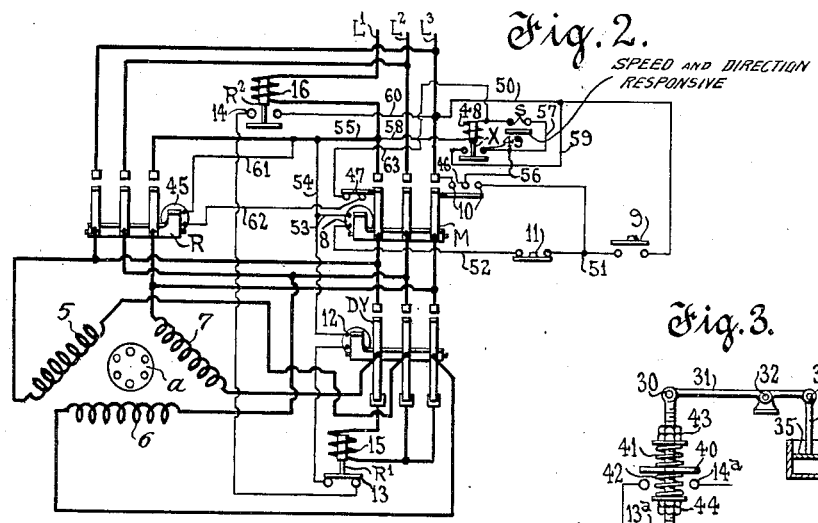
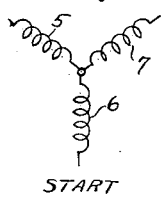
START
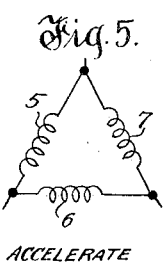
ACCELERATE
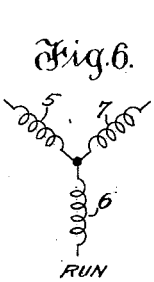
RUN
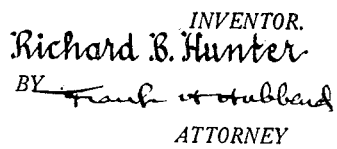
INVENTOR.
Richard B. Hunter
BY
ATTORNEY Patented Oct. 21, 1930

1,778,976

UNITED STATES PATENT OFFICE

RICHARD B. HUNTER, OF SHOREWOOD, WISCONSIN, ASSIGNOR, BY MESNE ASSIGNMENTS, TO CUTLER-HAMMER, INC., OF MILWAUKEE, WISCONSIN, A CORPORATION OF DELAWARE

METHOD OF AND APPARATUS FOR CONTROLLING ELECTRIC MOTORS

Application filed December 15, 1926. Serial No. 154,980.

This invention relates to a method of and apparatus for controlling electric motors.

It has heretofore been customary to connect induction motors of the squirrel-cage type in star for acceleration and then changing to delta for running. However, certain types of high speed machines require a high accelerating torque of the driving motor, but after such machines are up to speed only a very low torque of the motor is required. Furthermore it is frequently desirable to provide for stopping of the motor by plugging.

I have found that the requirements aforementioned may be simply and economically satisfied with an induction motor of the squirrel-cage type, by connecting the windings of the latter in delta during the accelerating period and then in star during the running period. This method of control is particularly advantageous in plants employing a multiplicity of centrifugal devices.

In some instances it is also desirable to provide for starting the motor in star and then, after the effect of the first peak has passed, connecting the same in delta for the remainder of the accelerating period. This change from star to delta during acceleration should be made at the earliest possible point in the accelerating period in order to avoid increasing the length of the latter for a given size motor. Consequently the final current peak would probably be very little less than if the motor were thrown directly into the delta connection. Nevertheless from the standpoint of power supply the two reduced current peaks would be considerably more desirable than one big peak. With the arrangement just described it is of course to be understood that the motor would be re-connected in star for running; whereas the same would likewise be connected in star during the plugging period.

An object of the invention is to provide a novel method of motor control as aforedescribed.

Another object is to provide novel means for carrying out such method.

Another object is to provide means of the above character for automatically controlling the circuit connections of the motor during starting, running or plugging of the latter.

Other objects and advantages of the invention will hereinafter appear.

The accompanying drawing illustrates certain embodiments of the invention which will now be described, it being understood that various changes may be made in the details of construction and operation of the embodiments illustrated without departing from the spirit and scope of my invention as defined in the appended claims.

In the drawing,

Figure 1 illustrates a controller constructed in accordance with my invention.

Fig. 2 illustrates a controller like that shown in Fig. 1, including novel means for effecting stopping of the motor by plugging.

Fig. 3 is a fragmentary view of a controller showing modified means for automatically commutating the motor circuit connections.

Figs. 4, 5 and 6 diagrammatically illustrate the star, delta and star connections for starting, accelerating and running, respectively.

Referring first to Fig. 1 of the drawing, M designates a three-pole electromagnetically operable main switch, adapted when closed to complete circuit from lines $L^1$, $L^2$ and $L^3$ to the respective windings 5, 6, and 7 of a polyphase induction motor, the rotor of which is designated by the reference character $a$. DY designates a three-pole double-throw electromagnetically operable switch, normally biased to one of its operative positions, as shown, to provide for initial connection of the motor in star upon closure of switch M; whereas upon movement of switch DY to its other operative position, in the manner hereinafter described, delta connections for the motor are provided.

The operating winding of switch M is indicated at 8; whereas the energizing circuit of said winding is adapted to be initially completed by closure of normally open push button switch 9, maintained by closure of normally open auxiliary contacts 10 on switch M, and interrupted by opening of normally closed push button switch 11. The operating winding of switch DY is indicated at 12, whereas completion of the energizing circuit of said winding is dependent upon simultaneous closure of normally closed contacts 13 and normally open contacts 14. Contacts 13 are subject to control by a series relay R¹, the operating coil of which is indicated at 15; whereas contacts 14 are subject to control by a series relay R², the operating coil of which is indicated at 16.

Operation of the controller will now be described, it being understood that the various elements are initially in the respective positions illustrated. Thus, upon closure of normally open push button switch 9 an energizing circuit is completed for the winding 8 of switch M; said circuit extending from line L³ by conductor 17 through said push button switch 9, by conductor 18 through switch 11, by conductor 19 through said winding 8, and thence by conductors 20 and 21 to line L¹.

Switch M thereupon closes, and the normally open auxiliary contacts 10 thereof in closing complete a maintaining circuit shunting the push button switch 9. Said circuit extends from line L³ by conductors 17 and 22 through said contacts 10, by conductors 23 and 18 through push button switch 11, and thence to line L¹ as just traced. The contacts of switch DY being in the normal position illustrated, closure of the contacts of switch M provides for connection of windings 5, 6 and 7 of the motor to lines L¹, L² and L³ in star relation to each other, as will be obvious.

With the first inrush of current to the motor windings the coil 15 of series relay R¹ is energized sufficiently to effect opening of its contacts 13, whereas the coil 16 of series relay R² is simultaneously energized sufficiently to effect closure of its contacts 14. Energization of the operating winding 12 of switch DY is thus prevented, whereby the motor is permitted to start with its windings connected in star. Relay R¹ is calibrated in any suitable or well known manner to permit reclosure of its contacts 13 after a given degree of acceleration of the motor, whereas relay R² is similarly calibrated to hold its contacts 14 closed under such conditions; whereby an energizing circuit is provided for the winding 12 of said switch DY. Said circuit extends from line L¹ by conductor 21 through said winding 12, by conductor 24 through the contacts 13 of relay R¹, by conductor 25 through the contacts 14 of relay R², and thence by conductor 26 to line L³. Switch DY is thus operated to effect opening of its normally closed contacts and closure of its normally open contacts, whereby the circuit connections for windings 5, 6 and 7 of the motor are transferred from star to delta.

The motor continues to accelerate under the aforedescribed delta connections, whereas upon completion of the accelerating period the current will have decreased sufficiently to permit reopening of the contacts 14 of relay R², thereby interrupting the energizing circuit for the winding 12 of switch DY. Switch DY thereupon assumes its normal position wherein the lower contacts thereof are closed and the upper contacts thereof opened, to effect reconnection of the motor windings 5, 6 and 7 in star for running.

When it is desired to stop the motor, push button switch 11 is depressed, thereby interrupting the aforedescribed maintaining circuit for the winding of switch M, and the latter in opening interrupts the line connections of the motor, as will be obvious.

Although I prefer to employ the series relays R¹ and R² to effect control of the operation of switch DY in the manner aforedescribed, it is to be understood that other means may be employed for this purpose, if desired. Thus, in Fig. 3 I have shown a modified form of control means whereby the points of change from star to delta for acceleration and then to star again for running are definitely timed with respect to the initial connection of the motor in star. In Fig 3 the normally closed contacts 13ª correspond functionally with the normally closed contacts 13 of relay R¹ in Fig. 1, and the normally open contacts 14ª correspond functionally with the contacts 14 of relay R². Thus upon energization of the winding 8 of switch M the latter is adapted to close to effect connection of the motor in star as aforedescribed, the switch DY (not shown in Fig. 3) being in the position illustrated in Fig. 1. The armature of switch M is provided with a rigidly connected arm or extension 27 which is adapted upon closure of said switch to exert a pull on a spring 28 interposed between said arm and a screw-threaded rod 29. Rod 29 is pivotally connected at 30 to one end of a lever 31, the latter being pivotally supported at 32, and the other end thereof being pivotally connected, as indicated at 33, to a rod 34. Rod 34 carries a piston or disk 35 adapted to cooperate with a cylinder or dashpot 36 for retarding the downward movement of rod 29 under the tension of spring 28.

A bridging contact or disk 37 is slidable on rod 29, said disk being normally biased to the position illustrated, wherein it engages contacts 13ª, by a spring 38 supported by adjustable lock nuts 39. A disk 40 is also slidable upon rod 29, said disk being normally held by the opposing springs 41 and 42 in the position illustrated, wherein it is out of engagement with contacts 14ª. The initial position of disk 40 may be changed by adjustment of the lock nuts 43 and 44, as will be obvious. Thus with a device as disclosed in Fig. 3 the motor will be initially connected in star upon closure of switch M, as aforedescribed, whereas after a given time interval disk 40 is brought into engagement with contacts 14ª, thereby completing the energizing circuit of the winding of switch DY, which closes to effect transfer from star to delta for the remainder of the accelerating period. Similarly, disengagement of disk 37 from contacts 13ª is effected after a predetermined interval to interrupt the energizing circuit last mentioned and thereby effect reconnection of the motor in star for running. Obviously by adjustment of the dashpot or of the initial position of disk 40 the period of connection in star for acceleration may be made of considerable duration, or practically zero, depending upon the interval of time between closing of main switch 2 and engagement of disk 40 with contacts 14ª.

Where it is desired to effect stopping of the motor by plugging, a device like that shown in Fig. 2 may be employed. The construction and operation of this device for starting, accelerating and running is in many respects exactly like that disclosed in Fig. 1, and corresponding parts have been given like characters of reference. However, I have additionally provided an electromagnetically operable switch R for reversing the motor circuit connections, the operating winding of said switch being indicated at 45. Switch M is likewise provided with an additional normally open auxiliary contact 46, and normally closed auxiliary contacts 47. Normally open contacts S are controlled by a device (not shown) which is responsive to the speed and direction of operation of the motor. Said device may, for example, be of the type disclosed in the patent to DuBois, No. 1,161,932, dated Nov. 30, 1915. A relay X is provided with an operating coil 48 adapted to be energized upon closure of auxiliary contacts 10 and 46 of switch M and contacts S aforementioned, the contacts 49 of said relay being adapted when closed to provide a maintaining circuit for the latter shunting the auxiliary contact 46 of switch M.

Thus upon closure of push button switch 9 an energizing circuit is provided for the winding 8 of switch M, said circuit extending from line $L^3$, by conductor 50 through said switch 9, by conductor 51 through switch 11, by conductor 52 through said winding 8, and by conductors 53, 54 and 55 to line $L^1$. Switch M thereupon closes to complete the initial star connections for the motor, and auxiliary contacts 10 thereupon act to provide a maintaining circuit for winding 8, as described in connection with Fig. 1. Auxiliary contact 46 is closed simultaneously with auxiliary contacts 10, and upon closure of contacts S, due to operation of the motor in a direction corresponding to closure of switch M, an energizing circuit for coil 48 of relay X is provided. Said circuit extends from line $L^3$ to the adjacent auxiliary contact 10, thence to auxiliary contact 46, by conductors 56 and 57 through contacts S, thence through said coil 48, and by conductor 58 to line $L^1$. Upon closure of contacts S and contacts 49 of relay X in the manner just described, a maintaining circuit is provided for the coil 48 of the latter, said maintaining circuit extending from $L^3$ by conductors 50 and 59 through said contacts 49, and thence by conductor 57 through contacts S, coil 48 and conductor 58 to line $L^1$.

Energization of winding 45 of reverse switch R is prevented under these conditions by opening of normally closed auxiliary contacts 47 of switch M, as will be obvious. Relays $R^1$ and $R^2$ operate in the manner aforedescribed to change from star to delta for acceleration and then back to star for running. Upon opening of push button switch 11, switch M is deenergized and opened thus effecting reclosure of auxiliary contacts 47 of the latter. This completes an energizing circuit for the winding 45 of switch R; said circuit extending from line $L^1$, by conductors 55 and 61 through said winding 45, by conductor 62 through auxiliary contacts 47 of switch M, by conductor 63 through contacts S, and thence by conductor 57 through contacts 49 of relay X, and by conductors 59 and 50 to line $L^3$. Switch R thereupon closes, thus reversing the power connections of the motor to effect stopping thereof by plugging. As soon as the motor is brought to rest and rotates very slightly in the opposite direction, contacts S are opened automatically, thereby interrupting the energizing circuit of winding 45 of switch R and the maintaining circuit of winding 48 of relay X. The motor circuit connections are thus interrupted when the motor has been brought to a dead stop.

It is to be noted that the motor is plugged when the latter is connected in star, thus affording a desirable reduction in the plugging torque as compared with that which would be obtained if the motor were plugged in the delta connection.

As aforeindicated, I am aware that it has heretofore been proposed to connect induction motors in star for the accelerating period, and to then connect the same in delta for running, but I believe that I am the first to provide for connection of such motors in delta for all or the greater part of the accelerating period, and to then change to star connections for running. Moreover, I have provided means for effecting the aforementioned operations automatically; whereas the advantages of such an arrangement will be apparent to those skilled in the art.

While I have illustrated my invention as applied to control of a three-phase induction motor it will be obvious to those skilled in the art that the same may be applied with equal facility to control of other similar types of polyphase induction motors.

What I claim as new and desire to secure by Letters Patent is:

1. The method of controlling a polyphase induction motor to provide a high accelerating torque capacity and a low running torque capacity, which comprises sequentially connecting the motor windings in star and delta during the accelerating period, and thereafter reconnecting the same in star for running.

2. The method of controlling a polyphase induction motor adapted to drive a device of high inertia, which comprises connecting the motor windings in star for a relatively small portion of the accelerating period, then connecting said motor windings in delta for the major portion of the accelerating period, and then reconnecting said motor windings in star for running.

3. In a controller for polyphase induction motors, the combination with means for connecting the motor windings in delta to provide for acceleration thereof, and means responsive to an electrical condition of the motor circuit for thereafter automatically connecting said motor windings in star for running.

4. In a controller for polyphase induction motors, the combination with means for initially connecting the motor windings in star and for thereafter connecting said windings in delta to provide a relatively high torque capacity thereof during the accelerating period, and means for thereafter automatically connecting said motor in star to provide for minimum exciting current thereof during the running period.

5. In a controller for a polyphase induction motor adapted to drive a device of high inertia, the combination with means for connecting the motor windings in delta during the accelerating period to provide a relatively high torque capacity thereof, and means operable automatically in response to an electrical condition of the motor circuit to thereafter change the connections of said motor windings from delta to star to provide for minimum exciting current of said motor during running.

6. In a motor control system, in combination, an electromagnetically operable main switch, a double-throw electromagnetically operable switch associated therewith and normally biased to a given operative position, means for effecting energization and closure of said main switch to thereby complete the motor circuit connections, means operable automatically thereafter in response to an electrical condition of the motor circuit to effect movement of said double-throw switch to its other operative position against the action of said bias and to thereafter permit movement of said double-throw switch to its initial position under said bias, to thereby directly commutate the motor circuit connections.

7. In a controller for polyphase induction motors the combination with an electroresponsive main switch and a double-throw electroresponsive switch biased to a given operative position to provide for initially connecting the motor windings in star upon closure of said main switch, means for thereafter effecting movement of said second mentioned switch to its other operative position to provide for connection of said motor windings in delta, and means for thereafter permitting movement of said second mentioned switch to its initial position under the action of said bias to effect reconnection of said motor windings in star for running.

8. In a controller for polyphase induction motors, the combination with an electroresponsive main switch and an electroresponsive double-throw switch associated therewith, said last mentioned switch being biased to a given operative position and adapted upon closure of said main switch to provide for initial connection of the windings of said motor in star, means responsive to electrical conditions in the motor circuit during the accelerating period to effect movement of said second mentioned switch to its other operative position to provide for connection of said motor windings in delta, said means being also responsive thereafter to permit movement of said second mentioned switch to its initial position under the action of said bias to effect reconnection of said motor windings in star for running.

9. In a controller for polyphase induction motors, the combination with an electromagnetically operable main switch, a manually operable switch adapted upon closure to complete an energizing circuit for said main switch, auxiliary contacts adapted upon closure of said main switch to provide a maintaining circuit therefor, means adapted upon closure of said main switch to initially provide star connections for the windings of said motor, said means comprising an electromagnetically operable double-throw switch normally biased to a given operative position, means thereafter operable automatically to complete an energizing circuit for said double-throw switch to effect movement thereof to its other operative position, thus providing delta connections for said motor windings, and means for thereafter automatically interrupting the energizing circuit of said double-pole switch to provide for reconnection of said motor windings in star for running.

10. In a controller for polyphase induction motors, the combination with an electromagnetically operable main switch, a manually operable switch adapted upon closure to complete an energizing circuit for said main switch, auxiliary contacts adapted upon closure of said main switch to provide a maintaining circuit therefor, means adapted upon closure of said main switch to initially provide star connections for the windings of said motor, said means comprising an electromagnetically operable double-throw switch normally biased to a given operative position, means thereafter operable automatically in response to an electrical condition of the motor circuit to complete an energizing circuit for said double-throw switch to effect movement thereof to its other operative position, thus providing delta connections for said motor windings, means also operable automatically in response to an electrical condition of the motor circuit for thereafter interrupting the energizing circuit of said double-throw switch to provide for reconnection of said motor windings in star for running, and a manually controlled switch adapted when operated to interrupt the energizing circuit of said main switch to thereby effect stopping of said motor.

11. In a controller for polyphase induction motors, the combination with means operable automatically in response to an electrical condition of the motor circuit for connecting the motor windings in delta during the accelerating period and for thereafter automatically connecting the motor windings in star for running, of means for effecting stopping of the motor by plugging while maintaining said star connections, said means comprising an electromagnetically operable reversing switch, and means for automatically controlling the operation thereof.

12. In a controller for polyphase induction motors, the combination with a pair of electromagnetically operable main switches respectively adapted when closed to provide reverse circuit connections for the motor, of a double-throw electromagnetically operable switch associated therewith, said last mentioned switch being normally biased to a given operative position and adapted upon closure of one of said first mentioned switches to provide for initial connection of the windings of said motor in star, means responsive to electrical conditions in the motor circuit for effecting energization of said double-throw switch to thereby provide for connection of the motor windings in delta during a portion of the accelerating period, said means being also operable to thereafter effect deenergization of said double-throw switch whereby the motor windings are reconnected in star for running, and means adapted upon opening of said one of said first mentioned switches to effect closure of the other of the same to thereby provide for stopping of said motor by plugging, while maintaining said star connections for the motor windings.

13. In a controller for polyphase induction motors, the combination with an electromagnetically operable main switch and an electromagnetically operable double-throw switch associated therewith, said last mentioned switch being normally biased to a given operative position and adapted upon closure of said first mentioned switch to provide for initially connecting the windings of said motor in star for a portion of the accelerating period, a plurality of relays having windings connected in series with the motor circuit, one of said relays having normally closed contacts and another having normally open contacts adapted to control the energizing circuit of said double-throw switch, said normally closed contacts being arranged to reclose under given electrical conditions to effect energization and movement of said double-throw switch to its other operative position whereby said motor windings are connected in delta for another portion of the accelerating period, said normally open contacts being arranged to reopen under other electrical conditions whereby said double-throw switch is deenergized to effect reconnection of the motor windings in star for running, another electromagnetically operable main switch adapted upon closure to reverse the motor circuit connections, means for effecting energization and closure thereof upon opening of said first mentioned main switch to thereby effect stopping of said motor by plugging while maintaining said star connections, and means responsive to the speed and direction of operation of said motor for effecting deenergization of said last mentioned switch.

In witness whereof, I have hereunto subscribed my name.

RICHARD B. HUNTER.